Patented Sept. 19, 1933

1,927,117

UNITED STATES PATENT OFFICE 1,927,117

PREPARATION OF PAINTING MATERIALS

Hermann Friedrich, Leverkusen, and Walter Droste, Leverkusen-Wiesdorf, Germany, assignors to I. G. Farbenindustrie Aktiengesellschaft, Frankfort-on-the-Main, Germany No Drawing. Application September 11, 1930, Serial No. 481,342, and in Germany September 23, 1929

9 Claims. (Cl. 134—39)

The present invention relates to a process for improving the ease with which pigments are blended with binding agents and to the products obtainable thereby.

According to the present invention the blending of pigments, such as for example, titanium white, lithopone, zinc white, iron red, blanc fixe and the like with binding agents, such as linseed oil, wood oil and the like, which may be diluted by the addition of solvents or diluents, such as turpentine, white spirit or other volatile thinners is performed in the presence of a small amount, say 0,1-3% calculated upon the pigment, of a compound of the probable general formula:

$$y.CO-NH(CHR.CHR_1.NA)_x.A_1$$

wherein $y$ stands for an aliphatic hydrocarbon radical having at least 9 carbon atoms, which hydrocarbon radical may contain one or more double bonds and which may be substituted by hydroxy groups, that means the grouping $y.CO$ stands for the radical of a saturated or unsaturated fatty acid, for example, a radical of lauric acid, palmitic acid, stearic acid, oleic acid, ricinoleic acid, R and $R_1$ stand for hydrogen or alkyl, for instance, methyl or ethyl, R and $R_1$ being similar or dissimilar; $A_1$ stands for hydrogen, alkyl, hydroxyalkyl $\begin{cases} \text{alkyl,} \\ \text{alkyl} \\ \text{halogen} \end{cases}$ $\begin{cases} \text{alkyl} \\ \text{alkyl} \\ \text{alkyl sulfuric acid radical} \end{cases}$ or $\begin{cases} \text{alkyl} \\ \text{alkyl} \\ \text{hydroxy group} \end{cases}$ A stands for hydrogen, alkyl, hydroxyalkyl, $x$ stands for a whole number.

For performing this process it is immaterial whether the compound in question is added to the dry pigment or to the binding agent or whether it is added to the mixture.

The compounds in question can be obtained by the action of fatty acids or esters thereof on alkylene diamines or derivatives thereof substituted asymmetrically on the nitrogen atom or on polyalkylene-polyamines (such as for example, triethylenetetramine of the formula):

$NH_2-CH_2-CH_2-NH-CH_2-CH_2-NH-CH_2-CH_2-NH_2$

The corresponding N-alkyl derivatives, including the quaternary ammonium bases and also their salts as hydrogen halide and alkyl sulfuric acid salts can be obtained from these products by known alkylation methods. Also mixtures of different compounds as are sometimes obtained in the preparation of these compounds have the same good effect.

The process is suitable both for producing thick pastes directly from the dry pigments, for the manufacture of thin pastes and also for the production of the latter from the thick pastes. The quantity of the binding agent or of the mixture of the binding agent with a solvent or diluent necessary for incorporating the pigment is often reduced by the addition of the above indicated compounds with the result that for attaining a certain consistency of paste a considerable economy of the binding agent or the like can be achieved. In the case of paints, lacquers and the like this economy of binding agent exerts an advantageous effect inasmuch as these paints or lacquers display an improved covering power as compared with those produced without the additions. Moreover, these additions frequently make it possible to dispense with a mechanical grinding appliance and to carry out the incorporating only by hand by means of simple stirring, which is of very great advantage for work on a small scale.

The following examples will further illustrate this invention without restricting it thereto:

*Example 1.*—100 parts by weight of titanium white are blended with 36 parts by weight of a mixture of equal parts of linseed oil varnish and a volatile thinner after the addition of 0,5 parts by weight of mono-oleyl-ethylenediamine of the formula:

$$C_{17}H_{33}-CO-NH-CH_2-CH_2-NH_2$$

The pigment can be incorporated very easily and a paint of satisfactory covering power is obtained. When working without the addition of mono-oleyl-ethylenediamine 56 parts by weight of a mixture of equal parts of linseed oil varnish and a volatile thinner are consumed; the covering power of this paint is low and the expenditure of labor necessary for the blending considerably greater.

A similar result is obtained when the mono-oleyl-ethylene-diamine is replaced by 0,25 part by weight of a mixture of substances obtainable from equal parts by weight of linseed oil varnish and triethylene-tetramine by heating to about 200° C. and distilling off the excess of triethylene-tetramine. The reaction product has the probable formula:

$C_{17}H_{31}-CO-NH-CH_2-CH_2-NH-$
$CH_2-CH_2-NH-CH_2-CH_2-NH_2$

*Example 2.*—100 parts by weight of titanium white are ground intimately with 1 part by weight of monostearyl-triethylenetetramine of the formula:

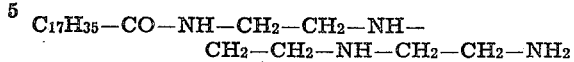
$$C_{17}H_{35}-CO-NH-CH_2-CH_2-NH-$$
$$CH_2-CH_2-NH-CH_2-CH_2-NH_2$$

The pigment obtained can be ground with about 38 parts by weight of a mixture of equal parts of linseed oil varnish and a volatile thinner far more easily than the original titanium white. Without the addition of monostearyl-triethylenetetramine about 65 parts of a mixture of equal parts of linseed oil varnish and a volatile thinner are consumed to produce a paste which can be applied by brushing.

Instead of the monostearyl-triethylenetetramine a monostearyl-triethylenetetramine, subjected to after treatment with propylene oxide of the formula:

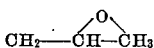
$$CH_2-CH-CH_3 \text{ (epoxide)}$$

can also be used.

*Example 3.*—In order to incorporate 100 parts by weight of zinc white into a paste about 26 parts by weight of linseed oil are necessary. When 1% of monooleyl-triethylenetetramine of the formula:

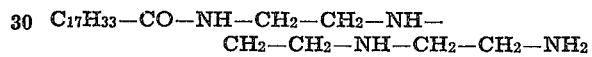
$$C_{17}H_{33}-CO-NH-CH_2-CH_2-NH-$$
$$CH_2-CH_2-NH-CH_2-CH_2-NH_2$$

is added to the linseed oil the same weight of zinc white requires only 19 parts by weight of linseed oil for producing a paste of the same consistency.

*Example 4.*—100 parts by weight of a lithopone require for the production of a paint for brushing about 55 parts by weight of linseed oil varnish. When 1% of the product obtainable by heating linseed oil with a mixture of bases produced by the action of dihalogenethane on ammonia under pressure is added to the linseed oil varnish only about 44 parts by weight of this linseed oil varnish are needed for converting the same quantity of lithopone into a paint suitable for application by brushing. The compound in question consists of a mixture of monolinoleyl-diethylene-triamine and monolinoleyl-triethylene-tetramine and monolinoleyl compounds of polyamines of the ethylene series containing more than 4 N-atoms, which polyamines are obtained by the action of ethylenechloride on ammonia besides the ethylene-diamine, diethylene-triamine and triethylene-tetramine. In addition to this economy of material a considerable economy of labor in the grinding is achieved.

We claim:

1. Compositions of matter comprising a pigment, a binding agent and 0.1-3% by weight, calculated upon the pigment present, of a compound of the probable general formula:

$$y.CO.NH(CHR.CHR_1.NA)x.A_1$$

wherein $y$ stands for an aliphatic hydrocarbon radical having at least 9 carbon atoms, R and $R_1$ stand for hydrogen or alkyl, $A_1$ stands for hydrogen,

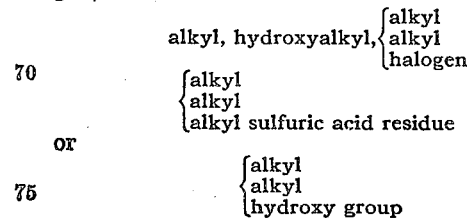

alkyl, hydroxyalkyl, {alkyl, alkyl, halogen}

{alkyl, alkyl, alkyl sulfuric acid residue} or

{alkyl, alkyl, hydroxy group}

A stands for hydrogen, alkyl or hydroxyalkyl, and $x$ stands for a whole number, said compositions of matter being painting materials of improved covering power.

2. Compositions of matter comprising a pigment, a binding agent and 0.1-3% by weight, calculated upon the pigment present, of a mixture of compounds obtainable by heating linseed oil with a mixture of bases produced by the action of dihalogenethane on ammonia under pressure, said compositions of matter being painting materials of improved covering power.

3. A composition of matter consisting of 100 parts by weight of lithopone, 44 parts by weight of linseed oil varnish and 1 part by weight of a mixture of compounds obtainable by heating linseed oil with a mixture of bases produced by the action of dihalogenethane on ammonia under pressure, said composition of matter being a valuable paint for brushing of great covering power.

4. Compositions of matter comprising a pigment, a binding agent comprising a drying oil and 0.1-3% by weight, calculated upon the pigment present, of a compound of the probable general formula:

$$y.CO.NH-(CHR.CHR_1.NA)x.-A_1$$

wherein $y$ stands for an aliphatic hydrocarbon radical having at least 9 carbon atoms, R and $R_1$ stand for hydrogen or alkyl, $A_1$ stands for hydrogen, alkyl, hydroxyalkyl, {alkyl, alkyl, halogen}

{alkyl, alkyl, alkyl sulfuric acid radical} or

{alkyl, alkyl, hydroxy group}

A stands for hydrogen, alkyl or hydroxyalkyl, and $x$ stands for a whole number, said compositions of matter being painting materials of improved covering power.

5. Compositions of matter comprising a pigment, a binding agent comprising a drying oil and 0.1-3% by weight, calculated upon the pigment present, of a mixture of compounds obtainable by heating linseed oil with a mixture of bases produced by the action of dihalogenethane on ammonia under pressure, said compositions of matter being painting materials of improved covering power.

6. Compositions of matter comprising an inorganic pigment, a binding agent comprising a drying oil and 0.1-3% by weight, calculated upon the pigment present, of a compound of the probable general formula:

$$y.CO.NH-(CHR.CHR_1.NA)x.-A_1$$

wherein $y$ means an aliphatic hydrocarbon radical having at least 9 carbon atoms, R and $R_1$ stand for hydrogen or alkyl, $A_1$ stands for hydrogen, alkyl, hydroxyalkyl, {alkyl, alkyl, halogen}

{alkyl, alkyl, alkyl sulfuric acid radical} or

{alkyl, alkyl, hydroxy group}

A stands for hydrogen, alkyl or hydroxyalkyl, and $x$ stands for a whole number, said compositions of matter being painting materials of improved covering power.

7. Compositions of matter comprising an inorganic pigment, a binding agent comprising a drying oil and 0.1–3% by weight, calculated upon the pigment present, of a mixture of compounds obtainable by heating linseed oil with a mixture of bases produced by the action of dihalogenethane on ammonia under pressure, said compositions of matter being painting materials of improved covering power.

8. A composition of matter consisting of 100 parts by weight of titanium white, 36 parts by weight of a mixture of equal parts of linseed oil varnish and a volatile thinner, 1 part by weight of mono-oleylethylenediamine of the formula:

$$C_{17}H_{33}-CO-NH-CH_2-CH_2-NH_2$$

said composition of matter being a valuable paint for brushing of great covering power.

9. A composition of matter consisting of 100 parts by weight of zinc white, 19 parts by weight of linseed oil and 1 part by weight of mono-oleyltriethylenetetramine of the formula:

$$C_{17}H_{35}-CO-NH-CH_2-CH_2-NH-CH_2$$
$$CH_2-NH-CH_2-CH_2-NH_2$$

said composition of matter being a paint suitable for brushing of great covering power.

HERMANN FRIEDRICH.
WALTER DROSTE.